June 10, 1952     W. H. TUCKER     2,600,342
ALTERNATING CURRENT MEASUREMENT BRIDGE
Filed Sept. 20, 1950
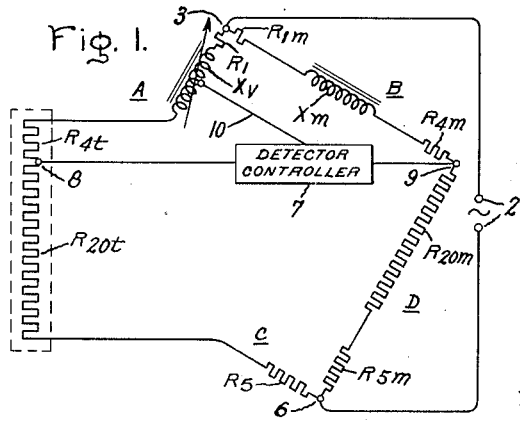
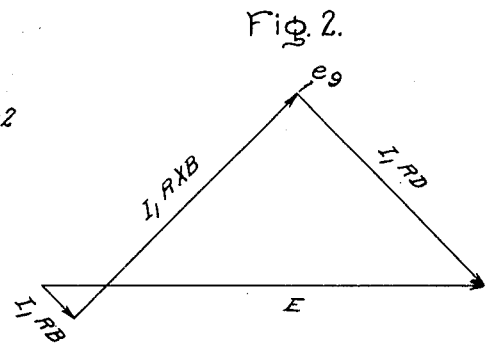
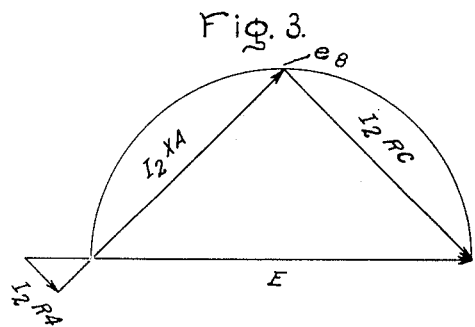
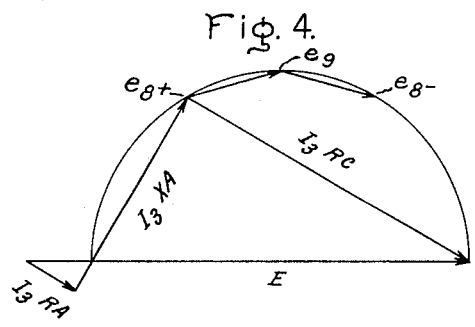
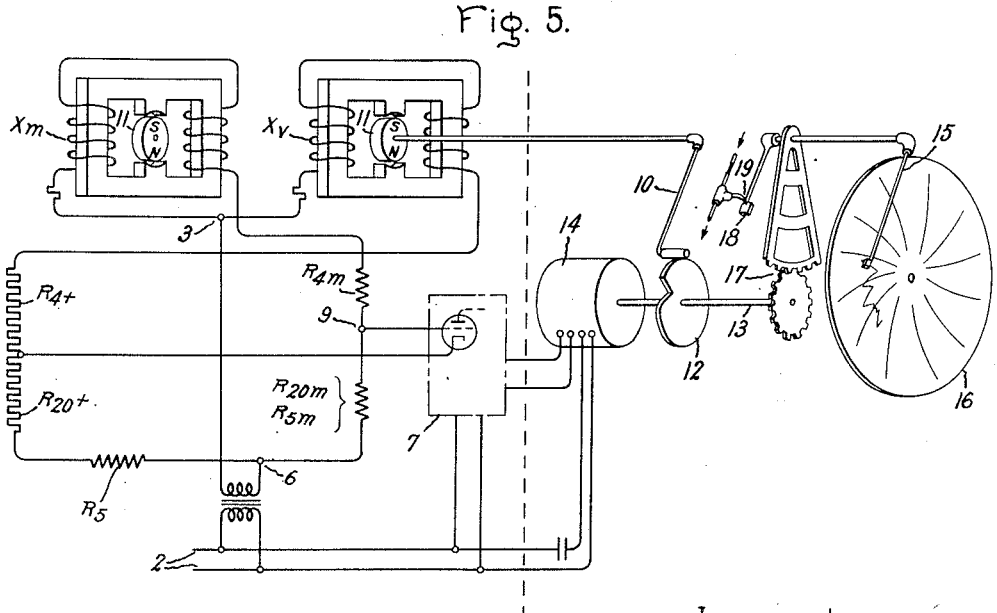
Inventor:
William H. Tucker,
by Russell A. Warner
His Attorney.

UNITED STATES PATENT OFFICE 2,600,342

ALTERNATING CURRENT MEASUREMENT BRIDGE

William H. Tucker, Saugus, Mass., assignor to General Electric Company, a corporation of New York Application September 20, 1950, Serial No. 185,743

4 Claims. (Cl. 323—64)

My invention relates to an alternating current measurement bridge, and its objects are to provide such a bridge of the null type suitable for commercial frequency supply which is relatively small in size and cost, which has no moving contacts, and which when in balance produces no out-of-phase voltage component.

The features of my invention which are believed to be novel and patentable will be pointed out in the claims appended hereto. For a better understanding, reference is made in the following description to the accompanying drawing in which Fig. 1 represents a simplified wiring diagram of my improved bridge. Figs. 2, 3 and 4 are vector diagrams which will be referred to in explaining the operation of the bridge, and Fig. 5 represents the bridge as used for control and recording purposes.

Referring now to Fig. 1, the bridge shown includes four arms designated A, B, C and D. Arm A contains a variable inductance designated $Xv$, $X$ designating a mid-range value of such reactance and $v$ that it is variable. Such reactance naturally includes a coil and connections having a small amount of resistance, which resistance remains constant when the reactance varies, and this constant resistance of the reactance $Xv$ is represented as $R1$. Arm B contains a fixed inductance $Xm$ having a value related to the mid-range value $X$ of inductance $Xv$ by the factor $m$. $R1m$ designates the resistance of inductance $Xm$, resistance $R1m$ being related to the value of resistance $R1$ by the same factor $m$. The resistance $R4t$ of arm A and the resistance $R20t$ of arm C are usually a single resistance element which may be remotely located and whose value is variable by some quantity to be measured such, for example, as temperature, strain, pressure, etc.; the "4" and "20" of these resistance designations represent the relative values of these resistance sections at some fixed temperature such, for example, as 20 degrees C., and $t$ indicates that such values vary with temperature. In arm B there is a fixed resistance $R4m$ related to the value of resistance $R4t$ at 20 degrees C. by the factor $m$. In arm D there is a fixed resistor $R20m$ related to the value of resistance $R20t$ at 20 degrees C. by the factor $m$. Also, in arms C and D are fixed resistors $R5$ and $R5m$, resistor $R5$ having a value such that the ratio $$\frac{R5}{R1} = \frac{R20t}{R4t}$$

Resistance $R5m$ has a value related to resistance $R5$ by the factor $m$. The factor $m$ is the same wherever used.

In designating the various elements of the bridge arms, I have here included designations which also represent one suitable value relationship between such elements. Thus, 1, 4, 20 and 5 represent the value relation between resistances $R1$, $R4t$, $R20t$ and $R5$ at 20 degrees C. The resistances $R20m$, $R5m$, and $R5$ may be combined as a single resistance element but are here shown separated for clarity. The bridge is energized from an A.-C. source of supply 2 at terminals 3 and 6, and a detector 7 is connected across the bridge between points 8 and 9. As will be explained in connection with Fig. 5 and as represented by the connection 10, the detector may initiate a control, which automatically rebalances the bridge when unbalanced, by adjustment of the variable reactance $Xv$, and the position of the adjusting means of the variable inductance $Xv$ may be calibrated in terms of the temperature being measured.

One of the difficulties heretofore experienced in the use of alternating current bridges of the null type employing a phase shifting inductance in the bridge circuit was that when the bridge was balanced with respect to the component of voltage in phase with the supply voltage, there remained an out-of-phase unbalanced voltage component to cause difficulties except possibly at one particular balancing point. With my bridge when a balance is obtained with respect to the inphase voltage component, there is no out-of-phase component at any balanced condition within the measurement range of the bridge. In order to obtain this result, I employ a particular relation between the bridge elements which I will now explain.

By design, at 20 degrees C. we made the resistance relationship between arms A and C the same as between arms B and D. Thus, $$\frac{R1+R4t}{R20t+R5} = \frac{R1m+R4m}{R20m+R5m}$$

Also, in arms A and C by design, we made the resistance relationship between arms A and C such that when the temperature sensitive resistance element of these arms changes with temperature, the resistance relationship between arms A and C does not change. This will be clear by assuming definite values for the resistances. At 20 degrees C. let resistances $R1$, $R4t$, $R20t$ and $R5$ be equal to 1, 4, 20 and 5, respectively. The relationship $$\frac{R1+R4t}{R20t+R5} = \frac{5}{25} = \frac{1}{5}$$

Now assume that due to a rise in temperature, R4t and R20t increase by ten per cent and thus become equal to 4.4 and 22, respectively. The relation $$\frac{R1+R4t}{R20t+R5}$$

becomes $$\frac{1+4.4}{22+5}=\frac{5.4}{27}=\frac{1}{5}$$

Thus, while this unbalances the bridge, it does not change the resistance ratio relation $$\frac{R1+R4t}{R20t+R5}=\frac{R1m+R4m}{R20m+R5m}$$

From this it will be evident that to rebalance the bridge, we do not need to change any fixed resistance value but only the value of the variable reactance $Xv$.

The circle diagram for the arms B, D of the bridge for all conditions may be represented as in Fig. 2. In this figure E represents the voltage across the bridge between terminals 3 and 6; $I_1RB$ the voltage drop across the resistances $R1m$ and $R4m$ of arm B; $I_1RD$ the voltage drop across the resistances $R20m$ and $R5m$ of arm D; and $I_1RXB$ the voltage drop across the inductance $Xm$ of arm B. This diagram is the same for all conditions of the bridge because the elements of arms B and D are fixed and do not change in value or relation. $e9$ may designate the voltage at detector point 9 of the bridge. Similarly, Fig. 3 represents the circle diagram for arms A and C of the bridge when the bridge is balanced, and $e8$ the voltage at detector terminal 8. If these diagrams be superimposed one over the other, it will be noted that there is no voltage difference between $e8$ and $e9$ either in phase or out of phase with voltage E.

Fig. 4 may represent the circle diagram for arms A and C of the bridge when the bridge is unbalanced, where the resistances R4t and R20t have increased due to a rise in temperature above 20 degrees C. and the voltage drop across them has increased. The current $I_3$ in arms A and C is less than before.

To rebalance the bridge, the inductance $Xv$ is increased, reducing the current through arms A and C and thereby moving point $e8$ around the circle towards point $e9$ until bridge balance is restored, and when restored, the resistance and inductance voltage drop vectors will be exactly the same as in Fig. 3, but the current flow produced by such voltages will have a lower value. In Fig. 4 it will be noted that the unbalanced bridge voltage $+e8e9$ has a relatively large component parallel and thus in phase with supply voltage E, and a relatively small component at right angles to and hence out of phase with voltage E. However, as the bridge approaches a balance and $+e8e9$ becomes smaller and more nearly parallel to E, the out-of-phase component vanishes faster than the inphase component. An unbalanced bridge voltage $-e8e9$ is also represented for a condition where resistances R4t and R20t have decreased below their values at 20 degrees C. To rebalance for the $-e8e9$ voltage, the reactance $Xv$ would be decreased.

The reason why there is no out-of-phase unbalanced component of voltage when the bridge is balanced is that, regardless of the values of the variables $Xv$, R4t, and R20t, and any difference in current that may flow in arms B and D on the one hand and in arms A and C on the other hand, the ratio of inductance to resistance in the series circuit comprising arms A and C is the same as the ratio of inductance to resistance in the series circuit comprising arms B and D. And the ratio of inductance in arm A to the resistance in arm C is the same as the ratio of inductance in arm B to the resistance in arm D when the bridge is balanced, and consequently, the currents which flow past points 8 and 9 are exactly in phase and the voltages existing at points 8 and 9 are exactly in phase. Voltage variations in the source of supply do not produce error as all voltage vectors would change in proportion. When the bridge is balanced at any point within its measurement range the voltage vector diagrams for arm BD on the one hand and the arm AC on the other hand are exact duplicates in all respects. Over such range of measurement the current through arms B, D is constant with constant supply voltage for all balance points while the current through arms A and C will vary in inverse relation with respect to the values of R4t, R20t and $Xv$, but at any point of balance within the measurement range the currents in the two branch circuits of the bridge will be in exact phase relation.

Suitable values for the several elements of the bridge for measuring temperature over a range from 0 to 50 degrees C. with a 60 cycle 5 volt bridge supply are as follows:

| | |
|---|---|
| Inductance $Xm$ | .4 henry and 5 ohms both constant. |
| Inductance $Xv$ | .375 to .435 henry adjustable and 5 ohms constant. |
| Resistance R4m, 20 ohms | |
| Resistance R20m, 100 ohms | Constant and having a negligible temperature coefficient of resistance. |
| Resistance R5m, 25 ohms | |
| Resistance R6, 25 ohms | |
| Resistance R4t, 20 ohms | At 20 degrees C. and made of copper. |
| Resistance R20t, 100 ohms | |

The factor $m$ in this case is 1 but in theory could be any value. The temperature coefficient of resistance for the copper resistor unit comprising R4t and R20t may be $+.00393$ ohm/ohm/degree C. at 20 degrees C. For the measurement of higher temperatures it would be preferable to use a platinum resistor unit in place of copper having a temperature coefficient of resistance of $+.003$ ohm/ohm/degree C.

In connection with the design of the reactance coils it is most practicable to use copper which has a temperature coefficient of resistance, and to keep the resistance component of the reactance coils constant with possible variations in their temperature, it may be desirable to include the necessary amount of negative temperature coefficient conductor material in series with and in close proximity with the inductance coils. Such material may be included in the resistances represented at R1 and R1m, and in which case it is to be understood that the total resistance of each reactance coil plus its compensating resistance is to have a value relation with respect to other bridge resistors as previously explained, and when I refer to the resistance or resistance component of such reactances I mean to include any such compensating resistances as may be used therewith.

In Fig. 5 I have represented my bridge circuit as used for measuring, recording and controlling temperature. Resistances R20m and R5m of Fig. 1 are combined as a single resistance. The resistances R1 and R1m will be included in the windings and leads of the reactances $Xv$ and $Xm$. Resistances R4t and R20t generally will be a single temperature sensitive resistance located at the point where the temperature is to be measured. In any event the coefficient of variation of R4t and R20t in response to a measurement change will be the same. The reactances $Xv$ and $Xm$ are of the saturable core type, and each may consist of a three-limb magnetic structure having the winding divided into two coils on the outer limbs and connected to circulate alternating flux in the same direction about such outer limbs. The center limb of the structure contains an air gap in which is located a permanent rotor element 11 which is adjustable so as to send more or less of its flux through the outer limbs and thus determine the degree of saturation thereof and hence the reactance offered by the winding thereon. The rotor magnet 11 of reactance $Xm$ is adjusted once for all when the apparatus is first calibrated and then remains fixed. The rotor magnet 11 of reactance $Xv$ is automatically adjustable through a crank arm 10 which rests on a properly shaped cam 12 secured on the shaft 13 of a two-phase reversible alternating current servomotor 14. The reversible motor 14 is supplied from the alternating current source 2 through an electronic power amplifier included as a part of the bridge detector 7. It is to be understood that when the bridge is balanced the motor 14 is idle, when the bridge is unbalanced in one direction the motor runs in a direction to rebalance the bridge, and when the bridge is unbalanced in the opposite direction the motor has a reverse direction of rotation to rebalance the bridge.

To those familiar with electronic detectors, the importance of eliminating interfering, out-of-phase unwanted signals of the same frequency as the useful inphase component signal furnished to the detector by the bridge as the bridge approaches a balanced condition will be appreciated. It is to be understood that in the installation of the bridge and bridge circuits the resistance of circuit connections is to be taken into consideration in coordinating the relative values of bridge resistances. For example, the bridge connection between elements $R4t$ and $Xv$ may be of considerable length and its resistance will be computed as a part of the constant resistance of $Xv$ represented at $R1$.

The shaft 13 also drives a temperature indicating and recording stylus 15 over a chart 16 through gearing 17. At 18 there is represented a vane which varies the pressure of air escaping from an orifice 19 in a pressure control system which may be used for pneumatic valve control of a fuel supply system furnishing fuel to a furnace the temperature of which is being measured by the bridge for temperature control purposes. The power amplifier, servomotor, temperature control and recording features mentioned are well known in the art and are not my invention and have been included to represent one practicable application of the use of my improved alternating current bridge.

From the foregoing description it will be evident that the bridge described may be made of relatively low cost, small size components, that it does not require a high frequency source of supply to keep its cost and size low but is suitable for use with a standard commercial frequency source of power supply. The bridge employs no moving contact devices and supplies a detector signal which reverses in phase with respect to the supply voltage when the bridge is unbalanced in opposite directions and which is proportional to the degree of unbalance, and the component of signal voltage which is at right angles to the useful signal is always small in comparison to the useful component and disappears entirely for all bridge balanced conditions within the measurement range of the bridge.

What I claim as new and desire to secure by Letters Patent of the United States is:

1. An alternating current measurement bridge comprising four arms, joined by opposite first and second supply terminals and by opposite first and second detector terminals, the arm between the first supply and detector terminals comprising a bridge balancing variable reactance, a fixed resistance and a variable resistance designated for identification as $Xv$, $R1$ and $R4t$ respectively, the arm between the first supply and second detector terminals consisting of a fixed reactance and two fixed resistances designated as $Xm$, $Rm$ and $R4m$ respectively, the arm between the first detector terminal and second supply terminal consisting of variable and fixed resistances designated $R20t$ and $R5$ respectively, and the arm between the second detector terminal and second supply terminal consisting of fixed resistances designated $R20m$ and $R5m$ respectively, said variable resistances $R4t$ and $R20t$ consisting of a measurement resistance all parts of which have similar variation characteristics in response to some variation to be measured, the values of $Xv$, $R1$, $R4t$, $R20t$ and $R5$ being similarly related to the values of $Xm$, $R1m$, $R4m$, $R20m$, and $R5m$ respectively at some values of $Xv$, $R4t$ and $R20t$ within their ranges of variation, and $$\frac{R5}{R1}$$

being equal to $$\frac{R20t}{R4t}$$

for all values of $R20t+R4t$ within the range of measurement.

2. An alternating current measurement bridge as claimed in claim 1, where 1, 4, 20, 5 and $m$ in the resistance designations of such claim are factors indicative of the relative values of said resistances for a given measurement value of $R4t+R20t$.

3. An alternating current measurement bridge comprising a pair of supply terminals and two parallel circuits between such supply terminals, each such parallel circuit containing two series connected bridge arms with detector terminals at the junction points of said arms, one of said parallel circuits consisting of a fixed inductance and fixed resistance and the other parallel circuit consisting of a bridge balancing variable inductance, a variable measurement resistance and fixed resistance, the two inductances being contained in bridge arms adjacent one supply terminal, the variable measurement resistance being contained partially in one bridge arm and partially in the other bridge arm which are in series with the variable inductance, and the fixed resistances being connected in the bridge arm adjacent the other supply terminal and in that portion of the fixed inductance bridge arm which is adjacent the detector terminal thereof, the values of the bridge elements being chosen such that for all conditions within the operating range of the bridge the ratio of inductance to resistance in each of the parallel circuits is the same when the bridge is balanced.

4. An alternating current bridge having first and second bridge arms connected in series between first and second supply terminals respectively, said first arm containing a bridge balancing variable inductance, a variable measurement resistance a portion of which is contained in the first and a portion in the second bridge arms, third and fourth bridge arms connected in series betwen said first and second supply terminals respectively, the third arm containing a fixed inductance, and all four of said arms containing fixed resistances, the inductances in the first and third arms being connected to the first supply terminal and the fixed resistances in the second and fourth arms being connected to the second supply terminal, a detector terminal between the first and second arms at a point on the variable measurement resistance and a second detector terminal between the third and fourth arms at a point between the fixed resistances, said bridge being balanced by adjustment of the variable inductance when the variable measurement resistance changes, the values of the bridge elements being chosen so that the ratio of inductance to resistance in the first and second bridge arms will be the same as the ratio of inductance to resistance in the third and fourth bridge arms for all conditions of bridge balance within the operating range of the bridge.

WILLIAM H. TUCKER.

REFERENCES CITED

The following references are of record in the file of this patent:

UNITED STATES PATENTS

| Number | Name | Date |
|---|---|---|
| 2,365,706 | Keinath | Dec. 26, 1944 |
| 2,444,410 | Keinath | June 29, 1948 |
| 2,444,733 | Gille et al. | July 6, 1948 |